United States Patent [19]
Ward et al.

[11] Patent Number: 5,669,998
[45] Date of Patent: Sep. 23, 1997

[54] HEAT-SEAL SPLICING ASSEMBLY AND METHOD

[75] Inventors: James K. Ward, Rockton; Daniel S. Kelly, Rockford, both of Ill.; Timothy J. Searles, Brodhead, Wis.

[73] Assignee: Martin Automatic Inc., Rockford, Ill.

[21] Appl. No.: 434,748

[22] Filed: May 4, 1995

[51] Int. Cl.$^6$ ............................................. B65H 69/06
[52] U.S. Cl. ..................... 156/159; 156/157; 156/504; 242/552; 242/556
[58] Field of Search .............................. 156/157, 159, 156/304.1, 304.3, 304.6, 308.2, 502, 504, 505, 506; 242/552, 556, 556.1

[56] References Cited

U.S. PATENT DOCUMENTS

| | | | |
|---|---|---|---|
| 3,659,767 | 5/1972 | Martin | 226/195 |
| 3,769,124 | 10/1973 | Johnson | 156/159 |
| 3,956,047 | 5/1976 | Johnson | 156/159 |
| 4,856,960 | 8/1989 | Wheeler et al. | 414/684 |
| 4,915,282 | 4/1990 | Martin et al. | 226/119 |
| 4,984,750 | 1/1991 | Shigeta et al. | 242/58.1 |
| 5,064,488 | 11/1991 | Dickey et al. | 156/159 |
| 5,514,237 | 5/1996 | Emenaker et al. | 156/159 |

*Primary Examiner*—James Sells
*Attorney, Agent, or Firm*—McAndrews, Held & Malloy, Ltd.

[57] ABSTRACT

A method and web splicing assembly for heat-seal splicing together a trailing end of running first, two-sided plastic material web and a leading end of a second, two-sided plastic material web, and then for heat-seal splicing together a leading end of third, two-side plastic material web and the trailing of the then running, second web so that after the webs have been spliced and are running, like surfaces of the webs face the same direction. The web splicing assembly includes first and second splicing sub-assemblies. The first sub-assembly has a first, relatively movable slide bar and a first, relatively fixed nip bar. The second sub-assembly has a second, relatively movable slide bar and a second, relatively fixed nip bar. The sub-assemblies are each movable between a first position and a second position. In their first positions, the sub-assemblies are disposed so that portions of the webs to be heat-seal spliced are clamped between the first slide bar and the second nip bar. In their second positions, the sub-assemblies are disposed so that the portions of the webs to be heat-seal spliced are clamped between the second slide bar and the first nip bar. Each slide bar carries a heated wire that heat severs the clamped web portions along a localized area that extends across the web portion and heat-seals parts of the clamped web portions together adjacent to the area.

10 Claims, 4 Drawing Sheets

HEAT-SEAL SPLICING ASSEMBLY AND METHOD

BACKGROUND OF THE INVENTION

The present invention relates to methods and apparatus for splicing two plastic material webs together. More particularly, the present invention relates to a method and a splicing assembly or machine for heat-seal splicing the trailing end of a first, two-sided plastic material web and the leading end of a second, two-sided plastic material web together; and then when the second web is running, for heat-seal splicing the trailing end of the second web and the leading end of a third, two-sided plastic material web together.

Two-sided plastic material webs, which have two surfaces of different characteristics, are used in the manufacture of disposable diapers and other products. For example, one surface of a low density poly web may be "rougher" than the other surface because of micro-embossing. When such webs are to be spliced, it is important that after splicing like or similar surfaces face in the same direction when the webs run through a subsequent process.

In the past, splicing machines have been employed to splice such two sided plastic material webs. In such machines, the splice was accomplished by applying tape to abutted leading and trailing ends of the webs to be spliced. A significant problem with the use of such tape splicing machines, and the resulting tape splices, is that a number of disposable diapers have to be discarded each time a splice is made. This is because, for example, a diaper(s) having the tape splice is commercially unacceptable. Splices occur relatively frequently due to the relatively high speed of the disposable diaper manufacturing lines. As a practical matter, there is no reliable way of determining, with any certainty, which diaper(s) includes the taped splice. Consequently, a number of diapers—up to as many as fifty—may have to be discarded after the splice.

Splicing machines that utilize heat-seal splicing, instead of tape splicing, have also been employed to splice such two-sided plastic material webs. While such machines have the obvious advantage of eliminating the tape, and its concomitant difficulties, those working in the art have long known that achieving a "good" heat-seal splice is a "tricky" proposition especially when the spliced webs will be used in relatively high speed manufacturing processes such as those used to manufacture disposable diapers. More particularly, the prior heat-seal splicing machines attempted to heat-seal the webs together by bringing a heated, controlled temperature element adjacent to the webs to be spliced and thus forming a heat-seal bond between the webs. To achieve such a bond, it was critical that the temperature of the element be closely monitored and maintained at a predetermined temperature. Thus the prior heat-seal splicers included closed loop temperature feedback systems or the like to monitor and control the splicing temperature of the heated element. These systems were relatively expensive and complicated and usually required frequent maintenance. Additionally, the resulting heat-seal splices can include "tails", that is, small pieces of the webs adjacent to the location of the splice. Disposable diapers, for example, that include splices having such "tails" are commercially unacceptable, and thus again, a number of disposable diapers may have to be discarded each time a splice is made.

Another serious disadvantage of the prior tape splicing machines and heat-seal splicing machines—especially those employed to splice webs used in disposable diaper manufacturing—was that the entire splicer structure had to be moved, reversed, between splices, in order that like surfaces of the spliced webs would face in the same direction. This required significant set up time and often had to be done in cramped quarters.

Hence, those working in the art have long been aware of the need for a relatively inexpensive, easy to use splicing machine that would reliably splice two sided plastic material webs so that like surfaces of the spliced webs would face in the same direction and so as to minimize the number of products that had to be discarded as a result of a the splice being made.

SUMMARY OF THE DISCLOSURE

The improved method and splicing assembly for the heat-seal splicing two sided plastic material webs together solves the aforementioned, longstanding problems in the art. More particularly, the improved splicing assembly of the present invention and the improved splicing method which may be performed utilizing that improved splicing assembly, afford a reliable and inexpensive way of heat-seal splicing the leading and trailing ends of two-sided plastic material webs so that side surfaces of the same characteristics will always face in the same direction as the spliced webs subsequently run through the web processing operation and so that only a relatively minimal number of diapers or products, which are made using the spliced webs, will need to be disposed of due to the making of a splice.

In the present invention, heat-seal splices can be reliably and repeatedly achieved without the need for an expensive, complicated and maintenance requiring feedback temperature control system. The resulting splice is relatively small, compact and thin, does not include any tails, and may be formed transversely to the path of travel of webs. A disposable diaper that includes such a splice should be commercially acceptable. Even where the disposable diaper manufacturer does not want to include any spliced seal within a diaper, the number of disposable diapers that need be discarded will be relatively small. Other important advantages of the present invention are that the improved splicing assembly has a relatively simple, straightforward construction which permits the assembly to be manufactured relatively inexpensively and that the improved assembly may be prepared for a splice relatively easily and quickly, even in cramped quarters.

Accordingly, it is a principal object of the present invention to provide an improved method and an improved splicing assembly for heat-seal, tapeless splicing the trailing end of a running first, two-sided plastic material web and the leading end of a second or new, two-sided plastic material web together, and then subsequently, for heat-seal splicing a leading end of a third or still another new, two-sided plastic material web and the trailing end of the then running second web together, and so on, new web after another. A related object of the present invention is to provide the improved method and splicing assembly, as described, where when running, the first web is being unwound from a roll which is located in one predetermined location relative to the web splicing assembly; where the first web runs along a predetermined path of travel from the first roll, past the splicing assembly, through a web festoon and through the web processing operation; where the second web is adapted to be unwound from a second roll which is located at another predetermined location relative to the web splicing assembly; where the third web is adapted to be unwound from a third roll, which will be located in the first location after the second web is spliced to the first web and when the second web is running along the path of travel; where the plastic material of the webs is the same material and will melt when heat, above a predetermined temperature is applied to the web material; where the webs each have one surface with common characteristics; and where after the webs have been spliced and the spliced webs are running along the path of travel, downstream from the web splicing assembly, like or similar surfaces of the webs face in the same direction.

A further object of the present invention is to provide an improved method for heat-seal splicing, as described above, including the steps of disposing a portion of the leading end of the second web in the splicing assembly adjacent to and facing, like surface to like surface, the first web running by the splicing assembly; momentarily stopping the running of a portion of the trailing end of the first web, adjacent to the splicing assembly, by clamping at least a part of the trailing end portion of the first web, in like surface to like surface contact, with at least a part of the leading end portion of the second web so that the parts of the first and second web portions are clamped in a surface relationship; applying heat to a localized area of the first and second web portions, where the area extends the full width of the first and second webs so that the webs are melt severed at and along the area and are heat-sealed together adjacent to the area; maintaining the parts of the first and second web portions clamped together for a relatively short time after the first and second web portions have been severed so that the heat-seals, formed adjacent to the area, may cool as required and unclamping the parts of the first and second web portions and permitting the first web portion to begin running again and to take the second web with it, due to the downstream's heat-seal between the first and second web portions. A related object of the present invention is to provide an improved method, as described, including the steps of clamping the part of the first web portion to the part of the second web portion so that the second surface of the first web is in contact with the first surface of the second web and so that the leading edge of the second web portion is directed in a direction generally opposite to that of the pre-clamped direction of travel of the first web portion whereby after splicing, the first surface of the first web will face the same direction as the first surface of the second web when the spliced first and second webs run along the path of travel.

A still further object of the present invention is to provide an improved heat-seal, splicing assembly, as described, that includes: a first splicing sub-assembly that is disposed adjacent to one side of the path of travel of the web running, that has a first relatively movable slide bar and a first relatively fixed nip bar, and that is movable between a first position in which its first slide bar is disposed in a first location adjacent to and on one side of the path of travel and in which the first nip bar is disposed away from the first location, and a second position in which the first nip bar is disposed in the first location and in which the first slide bar is disposed away from the first location; where the assembly also includes a second sub-assembly that is disposed adjacent to the opposite side of the path of travel, that has a second relatively fixed nip bar and a second relatively movable slide bar, and that is movable between a first position in which the second nip bar is disposed in a second location adjacent to the opposite side of the path of travel and facing the first slide bar of the first sub-assembly, when the first sub-assembly is in its first position, and in which the second slide bar is disposed away from the second location, and a second position in which the second slide bar is disposed in the second location and in which the second nip bar is disposed away from the second location; where means are provided for selectively moving the first slide bar in the direction toward the second nip bar, when the first and second sub-assemblies are in their first positions, so as to clamp therebetween a portion of the web to be spliced and a portion of the running web and to stop the running of the clamped portion of the running web from continuing to run along the path of travel; where means are provided for selectively moving the second slide bar in a direction toward the first nip bar when the first and second sub-assemblies are in their second position, so as to clamp therebetween a portion of the then running web and a portion of the web to be spliced and to stop the running of the clamped portion of the running web; where the first and second slide bars each including means for applying heat, above the predetermined temperature needed to melt the plastic material, to a localized area of the clamped web portions which area extends the full width of the clamped web portions, so as to heat-sever the clamped web portions along the area and to heat-seal the adjacent parts of the clamped web portions together; and where means are provided for moving the first and second slide bars away from their respective second and first nip bars, after the clamped web portions have been heat-sealed together and momentarily cooled so that the running web may again begin to run along the path of travel together with the spliced web. A related object of the present invention is to provide an improved splicing assembly as described where the means for applying heat includes heated wires carried by and moving with the slide bars; and where as long as the temperature of the wire is maintained generally above the plastic material melting temperature, how much above, or how the temperature might vary above the melting temperature is of no particular consequence.

These and other objects, advantages and benefits of the present invention will become apparent to those skilled in the art from the following description of the drawings and the preferred embodiment of the present invention.

DESCRIPTION OF THE PREFERRED EMBODIMENT

Figure 1:
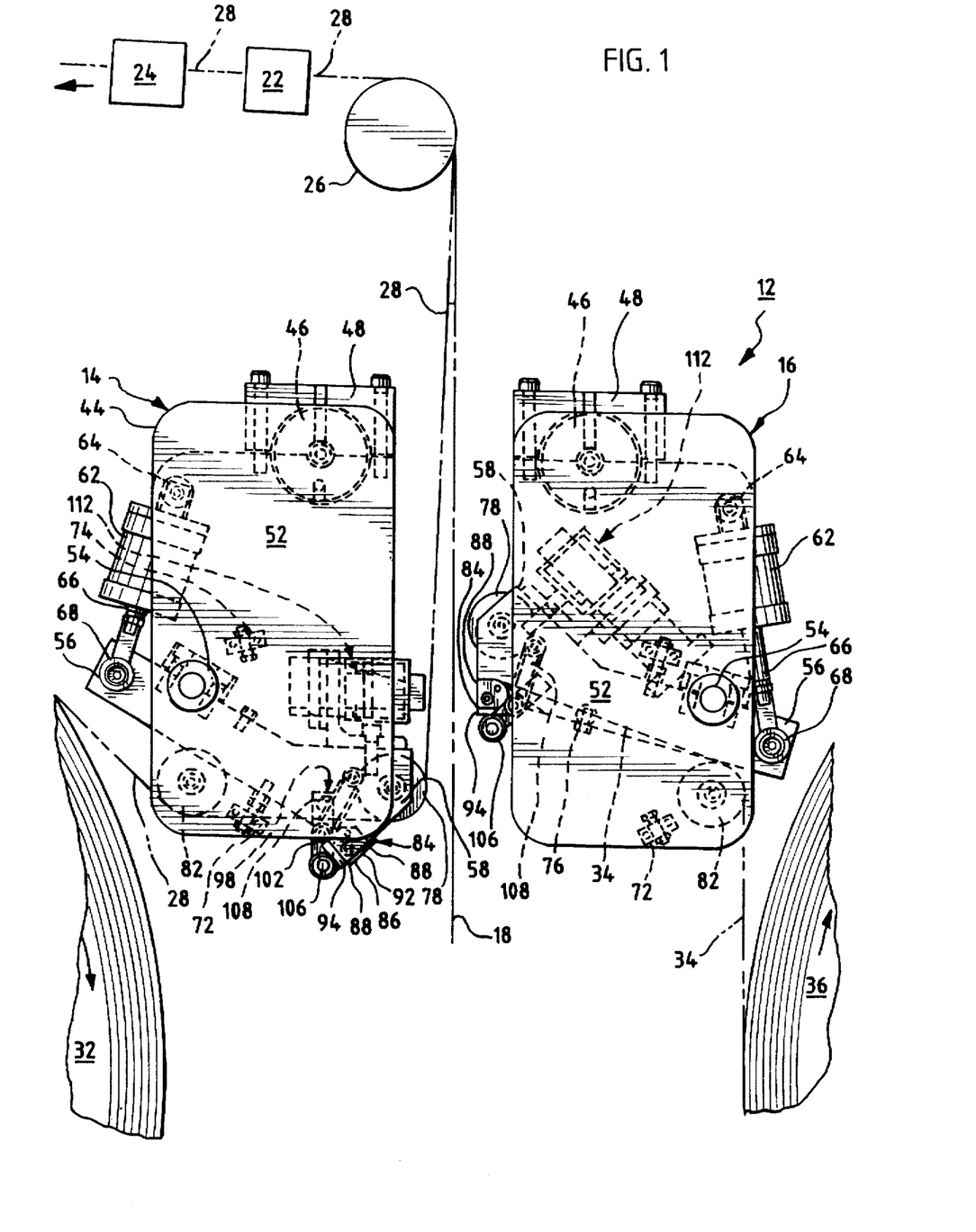
FIG. 1 is a partial, side elevational view of the splicing assembly of the present invention showing the first and second sub-assemblies disposed in their first positions.
Figure 2:
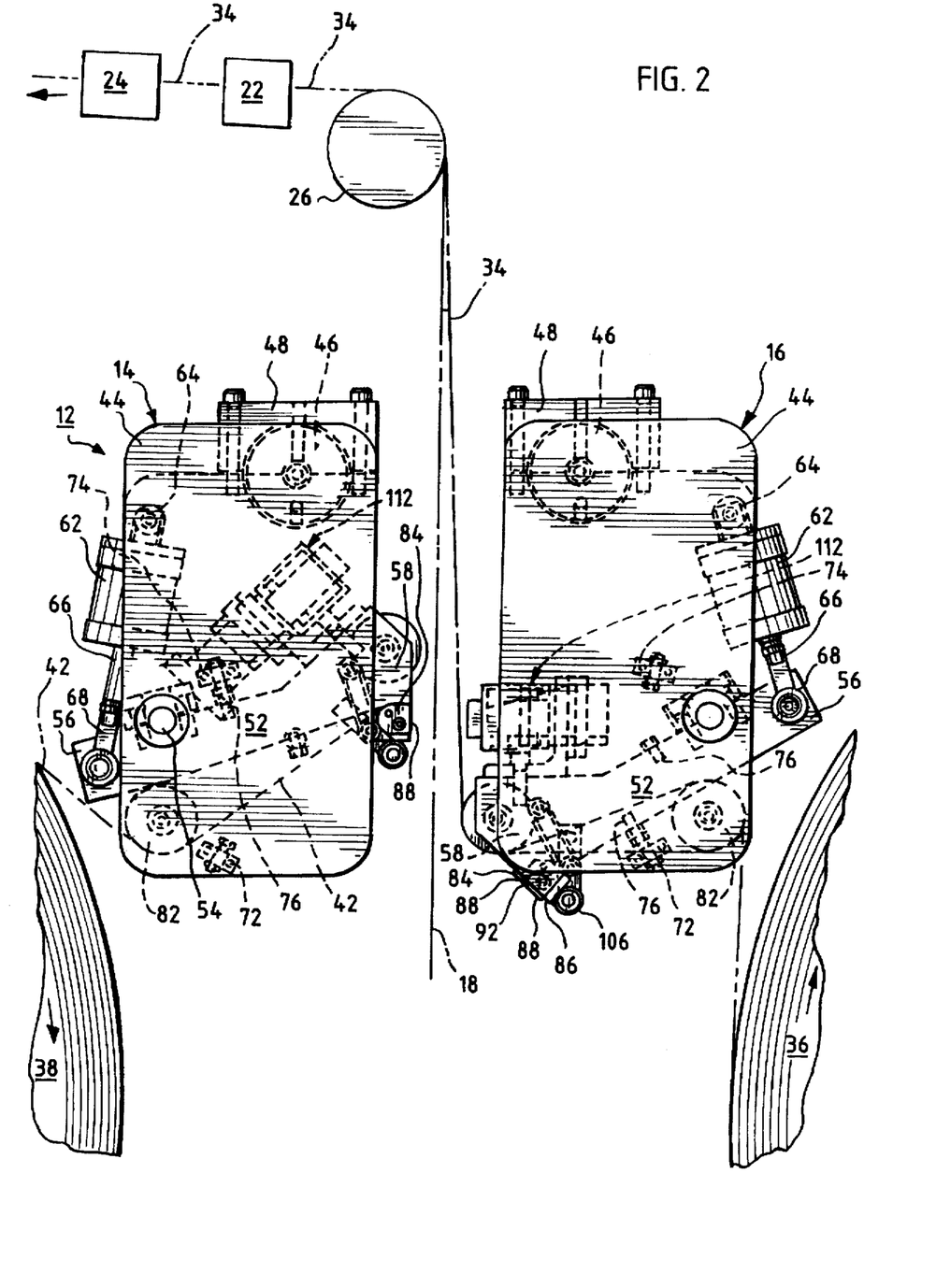
FIG. 2 is a view similar to FIG. 1 except that the first and second sub-assemblies are shown in their second positions.

Referring now to the drawings, an improved heat-seal splicing assembly, which embodies the principals of the present invention, is generally shown at 12 in FIGS. 1 and 2. The assembly 12 includes a first sub-assembly 14 and a second sub-assembly 16. These sub-assemblies are spaced from each other a predetermined distance and are equidistant from and about a central longitudinal axis, generally indicated at 18, which may be vertically disposed, as shown in FIGS. 1 and 2.

As hereinafter more specifically described, the splicing assembly 12 functions to heat-seal a trailing end of a running web, which is running along a predetermined path of travel, and a leading end of a new web. The path of travel of the running web includes a conventional festoon or web accumulator 22 and a conventional web handling or web processing operation 24. Such an operation 24 may comprise, for example, a disposable diaper manufacturing line where the running web is joined with other components to make disposable diapers at a relatively high rate of speed. Downstream from the assembly 12, the running web passes around a number of conventional rollers, one of which is being shown at 26.

As noted, the festoon 22 may be of conventional design but preferably is an inertia compensated festoon such as those manufactured by the assignee of this application and as generally described in U.S. Pat. Nos. 3,659,767 and 4,915,282. The festoon functions to permit the running web to continue running, at its normal speed, through the operation 24 during the short time that a portion of the running web (that is, a portion adjacent to the assembly 12) is momentarily stopped while a splice is being made by the assembly 12.

As best illustrated in FIG. 1, a first running web 28 is shown being unwound from a first roll 32 of plastic web material. The web 28 runs along the path of travel, that is, through and past the assembly 12 (actually, through the sub-assembly 14), around the roller 26, through the festoon 22 and to the web processing operation 24. A second web 34 is shown threaded for web splice preparation in the sub-assembly 16. This web 34 will be unwound from a second roll 36 of the same plastic web material. As illustrated in FIG. 2, the second web 34 becomes the running web after it has been spliced to the old, no-longer-running web 28. Specifically, the web 34 is shown running along the path of travel, that is, running through and past the assembly 12 (actually, the sub-assembly 16), past and around the roller 26, through festoon 22 and to the operation 24, as it is being unwound from the second roll 36. As also shown in FIG. 2, the first roll 32 has now been replaced by another or third roll 38 of the same plastic web material. A third web 42, wound about the roll 38, is shown being threaded for a splice preparation in the first sub-assembly 14. After the next splice, that is, after the splice which heat-seals the leading end of the web 42 to the trailing end of the web 34, the roll 36 will be replaced by still another new web roll. This alternative replacement of the web rolls, after a splice, will continue for as long as web is required to run through the web processing operation 24.

The web rolls 32, 36 and 38 (and in turn, their replacements) are supported by a conventional roll mounting stands that locate the rolls in a predetermined location relative to the assembly 12. Preferably such a roll stand is a "lift and load" stand such as generally described in U.S. Pat. No. 4,856,960 and as manufactured by the assignee of this application.

Referring now again to FIGS. 1 and 2, the splicing assembly 12, and each of its sub-assemblies 14 and 16, extends transversely across the width of the webs such that the width of the sub-assemblies, perpendicular to the plane of the drawings, is greater than the width of the webs to be spliced in the assembly 12. Each of the sub-assemblies 14 and 16 are structurally and functionally identical. As hereinafter more fully explained, the components of each of the sub-assemblies 14 and 16 may be selectively moved between one of two positions which may, to facilitate their descriptions, be described as an extended position and a retracted position. In this regard, FIG. 1 illustrates the components of sub-assembly 14 in their retracted position while the components of sub-assembly 16 are shown in their extended position. Similarly, FIG. 2 illustrates the components of sub-assembly 14 in their extended position while sub-assembly 16 are illustrated in their retracted position. The components of the sub-assemblies 14 and 16 are as illustrated in FIG. 1 when the new web, which is to be spliced, is to be unwound from a roll located adjacent to the sub-assembly 16. Conversely, the components are disposed, as shown in FIG. 2, when a new web, which is to be spliced, is to be unwound from a roll located adjacent to the sub-assembly 14.

Since the sub-assemblies 14 and 16 are basically identical, a description of the sub-assembly structure will primarily focus on subassembly 14. More particularly, the sub-assembly 14 includes two end plates 44, one of which is being shown in FIG. 1, that basically support the other sub-assembly components. A longitudinal bar 46 extends between the end plates 44 and is connected with the end as plates by bolted brackets 48.

The sub-assembly 14 has a pair of splice arms, one of which is shown at 52. Each arm 52 is mounted, adjacent to an inwardly facing surface of its adjacent plate 44, on and for pivotal movement about a pivot shaft 54 which projects perpendicularly inwardly from that inner surface. Each arm 52 has first and second ends 56 and 58, respectively. The first end 56 is closer to the pivot shaft 54 than the second end 58.

Sub-assembly 14 includes a pair of conventional, double acting pneumatic cylinders, one of which is shown at 62. A cylinder is mounted on each end plate 44 by a pivot post 64 that projects perpendicularly inwardly from the inner face of the end plate 44. This mounting between the cylinder 62 and the post 64 permits the cylinders 62 to pivot about the longitudinal central axis of their mounting posts 64. The other, extendable/retractable end 66 of the cylinder 62 are each connected to the first end 56 of its respective adjacent splice arm 52 by a conventional connector 68 that permits pivotal movement between the ends 56 and ends 66 during the extension and retraction of the ends 66.

Conventional stop blocks 72 and 74 limit the amount that each of the splice arms 52 may rotate, under the action of the cylinders 62, about their shafts 54. These stop blocks are mounted on the inner faces of the end plates 44. The stop blocks 72 and 74 cooperate with rest buttons 76 that are carried by the arms and that are aligned with their respective, adjacent stop blocks.

A conventional web roller 78 extends between and is supported for rotation by the second ends 58 of the splice arms 52. Each sub-assembly also has another, conventional roller 82 that extends between and is supported for rotation by the end plates 44. The length of the roller 82 is selected so that movement of the arms 52 does not interfere with the roller.

In sub-assembly 14, a nip bar assembly 84 is also mounted between and supported by the second ends 58 of the splice arms 52. This assembly includes a solid nip bar whose width (that is, its dimension in the direction perpendicular to the inner surfaces of the end plates 44) is greater than the distance between the side edges of the webs to be spliced. The nip bar includes a first surface 86 that has two pads 88 secured thereto. These pads, which are made from a rubber sheeting (as for example, red silicone p.s.a.), extends transversely from one end of the nip bar to the other. The pads are spaced apart from each other a predetermined distance so as to define therebetween a transverse gap 92 that extends transversely the lengths of the pads.

The nip bar assembly 84 also includes a second surface 94 that has a rubber coating applied thereto as, for example, in the form of a tape. This second surface 94 is disposed at an angle of 90° to the first surface 86 and is on the upstream side (with reference to the path of travel of the surface 86).

A web preparation arm assembly 98 is supported on the splice arms 52 to clamp the end of the leading end portion of the new web to be spliced to the nip bar assembly in preparation for a splice. This assembly 98 includes a pair of arms 102, with an arm 102 being mounted on each of arms 52 in a sub-assembly. Specifically, one end of the arm 102 is mounted, for pivotal movement, by a pin on the end 58 of the adjacent arm 52. The other, distal ends of the arms 102 support and carry the ends of a roller 106 that extends between the arms 102. A pair of coil extension springs 108 serve to bias the arms 102, and thus the roller 106, against the surface 94 of the nip bar. One end of each spring 108 is mounted, at a location on the end 58 of the arms 52, spaced from the pinned end of its associated arm 102. The other end of the spring is connected with the associated arm 102 midway between its ends, and as noted, biases the arms 102 and thus the roller 106 into engagement with the coated surface 94 on the nip bar assembly 84. The roller 106 can be readily moved away from the surface 94 by the splicer assembly operator when he prepares the new web for splicing. The ends of the roller 106 may include knobs, not shown, to facilitate movement of the roller to and away from engagement with the coated surface 94.

In each sub-assembly, a slide bar assembly 112 is also mounted on and supported between the second ends 58 of the sub-assembly's pair of splice arms 52. The assembly 112 extends between the arms 52 and its width is greater than the width of the webs to be spliced.

Figure 3:
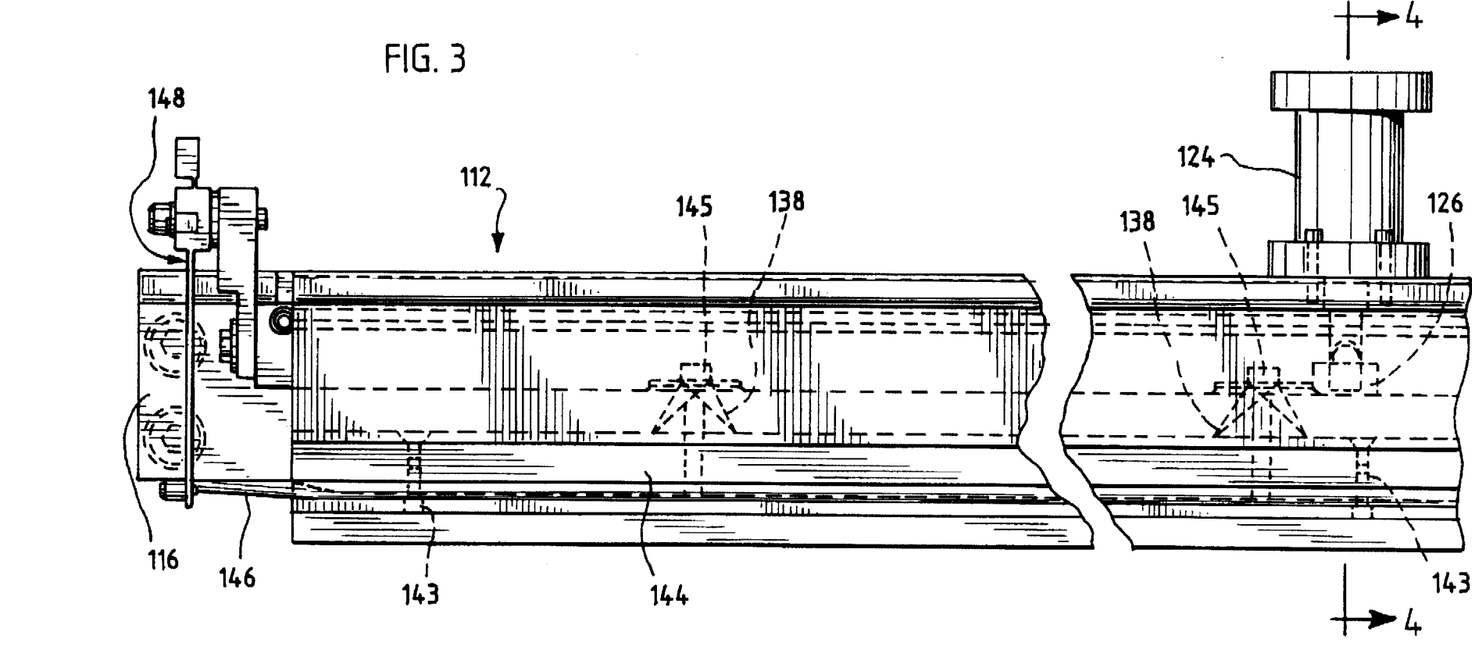
FIG. 3 is a top partial elevational view of one of the slide bars employed in the splicing assembly of the present invention.
Figure 4:
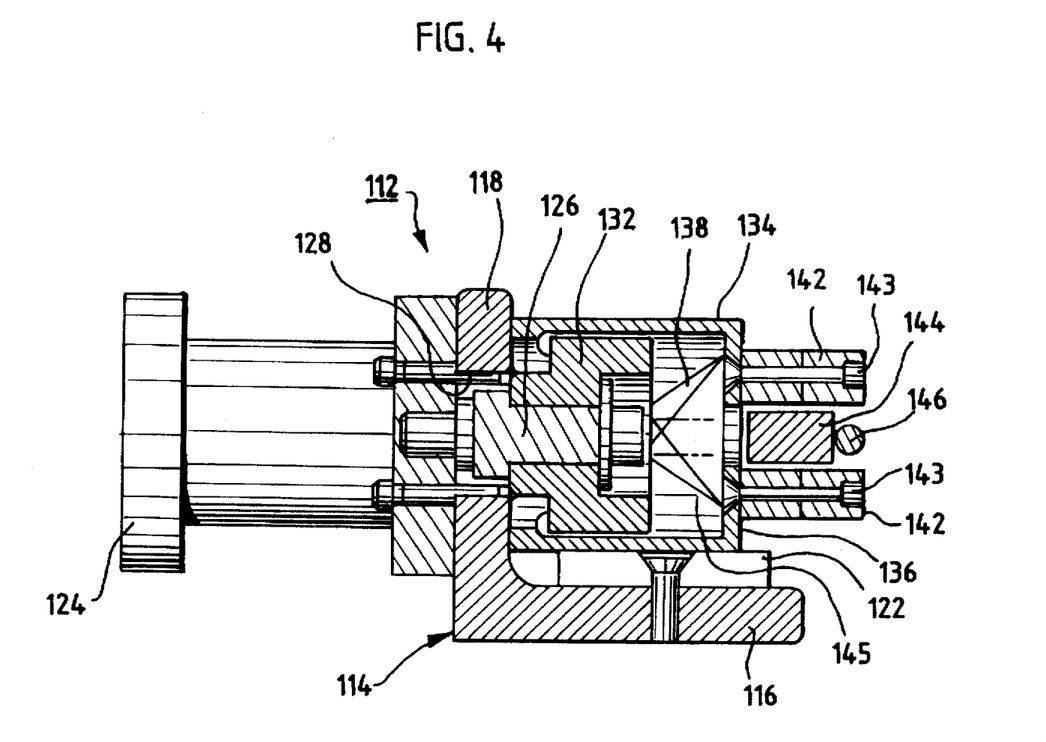
FIG. 4 is a cross-sectional view taken along the line 4—4 in FIG. 3.

As best illustrated in FIGS. 3 and 4, each slide bar assembly 112 is supported on a generally L-shaped mounting angle 114 that has two arms 116 and 118. The arm 116 of the angle is mounted on the end 58 of the arm 52 by, for example, a plurality of bolts. A slide block 122 may also be mounted along on the inside facing surface of the arm 116 and is made of a material that facilitates surface to surface sliding for reasons as hereinafter explained.

A plurality (preferably two) of conventional double-acting pneumatic cylinders 124 are mounted, for example by bolts, on the other arm 118 of the angle 114 and are evenly spaced between the end plates 44. Each of the cylinders 124 is structurally interconnected with the other parts of the assembly 112 in the same way. Accordingly, only one such cylinder and its interconnection will be described.

Referring now to FIG. 4, the extendable/retractable arm 126 of the cylinder 124 projects through an aperture 128 in the arm 118. A first slide bar 132 is secured to the end of the arm 126 so that it will reciprocally move with the arm. This bar 132 extends the width of the slide bar assembly 112.

A second slide bar 134, which has a generally U-shaped cross section and a "front" end 136 as shown in FIG. 4, fits over the slide bar 132. The bifurcated, rear ends of the bar 134 (that is, the ends adjacent to the cylinders 124) have small inwardly directed projections that contact the adjacent ends of the bar 132. This contact causes the bar 134 to move with the bar 132 when the cylinder arms 126 are retracted. Like the bar 132, the bar 134 extends from one end of the assembly 112 to the other.

The dimensions and arrangement of the bars 132 and 134 are such that the bars may, at times, slide relative to each other. One outer, side surface of the bar 134 rests on the slide block 122 and as noted above, this block 122 facilitates the sliding movement of the bar 132. A plurality (preferably three) of coil compression springs 138 extend between the bars 132 and 134 at evenly spaced intervals along the width of the assembly 112. The force of the springs 138 is sufficient so that the bar 134 normally initially moves with the bar 132 when the bar 132 is moved in response to an extension of the cylinder arm 126.

The front end 136 of the bar 134 carries a pair of frontwardly projecting, transversely extending web abutment pads 142. These pads 142 are secured to the end 136, as for example, by a plurality of bolts 143 and are spaced apart a predetermined distance so that a transversely extending gap exists between them.

A movable abutment member 144 is disposed within this gap. A plurality of threaded bolts 145 connect the bar 132 and the member 144 so that the bar and member move together. The bolts 145 extend through aligned apertures in the end 136 of the bar 134 and are coaxial with the springs 138 which surround the bolts. The abutment member 144 is made from a heat resistant material.

A conventional wire 146 is disposed adjacent the front end of the abutment member 144 and is tightly held in position by a pair of conventional, spring steel mounting and conductor assemblies 148 that are connected with the ends of the wire and that are, themselves, supported on the ends of the assembly 112. The wire 146 may be a 0.7 mm teflon coated wire. The diameter of the wire 146 is selected so it can easily fit within the gap 92, defined between the two pads 88 on the surface 86 of the nip bar assembly 84. The wire 146 is connected, in a conventional manner through the assemblies 148, to a conventional source of electrical power such that the wire may be heated to a temperature in excess of the melting temperature of the plastic material of the webs to be spliced. Conventional control means, not shown, controls the temperature of the wire in a conventional manner. As noted above, what is important is not the degree of control, but rather that the temperature control means is capable of heating the wire 146 to a preselected temperature which is generally above that needed to melt, relatively quickly, the plastic material of which the webs to be spliced are made.

Referring now to FIG. 1, the improved method of heat-seal, tapeless splicing will be described. As noted, the web 28 is being unwound, clockwise, from the roll 32 and is running along the path of travel (that is, again, by the splicing assembly 12, the roller 26, the festoon 22 and the operation 24). More particularly, the web 28 passes about the rollers 82 and 78 and then passes between the adjacent faces of the sub-assemblies 14 and 16. The new web to be spliced, web 34, is coiled on the roll 36. The web 34 will be unwound, clockwise from the roll 36. In preparing sub-assembly 16 for a splice, the leading end portion of the new web 34 is threaded, by the operator, around the roller 82, in a counter-clockwise direction as shown in FIG. 1, and then passed around the nip bar assembly 88 so that the web passes over the upper edge surface of the nip bar assembly, as shown in FIG. 1, and then down past the surface 86. The end of the leading edge portion of the web 34 is then clamped against the second surface 94 by the roller 106 of the prep arm assembly 98.

As noted, the first sub-assembly 14 is in its first or retracted position whereby its slide bar assembly 112 faces the axis 18 and the running web 28 passing adjacent thereto. The sub-assembly 16 is also in its first or extended position, and in that position, its nip bar assembly 84 faces the assembly 112 of the sub-assembly 14 across the axis 18. When the sub-assemblies 14 and 16 are in their first positions, the nip bar assembly 88 of the subassembly 14 faces generally downwardly, while the slide bar assembly 112 of the sub-assembly 16 faces generally upwardly, as illustrated in FIG. 1.

When the web 34 is thus prepared for a splice, its outer side surface (that is, the surface that is outwardly facing when the web is wound on the roll 36) faces toward from the nip bar assembly 84. Similarly, the outer side surface of the web 28, when running past the slide bar assembly 112 of the sub-assembly 14, faces toward that assembly 112. Hence, after the splice is made, the outer of the web 34 will face the same direction as the outer surface of the web 28.

When a splice is to be made, the cylinders 124 of the assembly 112 of sub-assembly 14 are actuated so that their arms 126 are extended and so that the bars 132 and 134 move toward the nip bar assembly 88 of the sub-assembly 16. As a result of this movement, a portion of the then running web 28 is clamped, like surface to unlike surface, against the web 34 and between the front ends of the pads 142 of the assembly 112 of the sub-assembly 14 and the surface 86 of nip bar assembly 88 of the sub-assembly 16. Due to this clamping, the portion of web 28 is stopped (that is, stops running). After this clamping has occurred, the arm 126 continues to extend. This continued extension causes the bar 132 to move forwardly (that is, to the front)—relative to the bar 134 and against the bias of the springs 138—and the bar 132 carries with it the abutment member 144 and thus the wire 146. Thus, this continued extension causes the wire 146, supported by the abutment member 144, to be pressed against the clamped webs along a thin, transverse, localized area which is approximately the width of the wire. Because of the temperature of the wire (which as noted, is above that of the melting temperature of the web's plastic material), the wire melts the material in which it is in contact and passes through the clamped webs thereby severing the webs. The heat of the wire also causes the portions of the webs adjacent to this localized area to heat-seal together. As the wire 146 severs the clamped webs, it passes into the gap defined between the two pads 88 on surface 86 of the assembly 84 of the sub-assembly 16.

After the wire 146 has passed through and severed the clamped webs, the cylinders 124 are actuated so as to initially retract the arms 126 a small distance whereby the wire 146 is moved back to the position shown in FIG. 4, that is, where the wire is disposed in the gap between the members 142 and out of contact with the clamped webs. After a short time interval (about, for example, one second), sufficient to assure that good, strong heat-seals are formed between the portions of the web adjacent to the localized area, the arm 126 is retracted further so that the pads 142 no longer clamp the webs and hold them against movement. The clamped portion of the running web 28 is then free to again run and to carry, because of the downstream heat seal formed between it and the web 34, the new web 34 with it. The time required for completing the heat seal, that is, from the time that the running web is stopped until it is again permitted to run, is relatively short in duration. Due to the festoon 22, the running web, downstream from the festoon, continued to run through the operation 24 while the clamped portion of the web 28 was stopped.

Once a splice has been completed, the operator then can prepare the assembly 12 for the next splice. He or she does this by replacing the old roll, roll 32 in FIG. 1, with a new web roll, roll 38, as shown in FIG. 2. The operator then moves the sub-assemblies 14 and 16 from their first positions, as illustrated in FIG. 1, to their second positions, as illustrated in FIG. 2. In their second positions, the sub-assembly 14 is in its extended position and sub-assembly 16 is in its retracted position. Thus when the sub-assemblies are in their second positions the splice will be made between the slide bar assembly 112 of sub-assembly 16 and the nip bar assembly 84 of sub-assembly 14. The operator will prep the leading end of the new web, web 42, by passing it about the roller 82 and nip bar assembly 84 of sub-assembly 14 in the same manner as described above with respect to the "prepping" of webs 34.

The preferred embodiment of the present invention has now been described. This preferred embodiment constitutes the best mode contemplated by the inventor for carrying out his present invention. The invention and the manner and process of making and using it has been described, it is believed, in such full, clear, concise, and exact terms as to enable a person skilled in this art to make and use the same. Changes can, of course, be made to the preferred embodiment of the invention. Accordingly and because the present invention may be copied without copying the precise details of the preferred embodiment, the following claims particularly point out and distinctly claim the subject matter which applicants regard as their invention:

We claim:

1. An improved method of heat-seal splicing a trailing end of a running first, two-sided plastic material web and a leading end of a second, two-sided plastic material web together, and then for heat-seal splicing a leading end of a third, two-sided plastic material web and a trailing end of the then running second web together, and so on; where when running, the first web is being unwound from a roll which is located in one predetermined location relative to a web splicing assembly; where the first web runs along a predetermined path of travel from the first roll, past the splicing assembly, through a web festoon, and through the web processing operation; where the second web is adapted to be unwound from a second roll which is located at another predetermined location relative to the web splicing assembly; where the third web is adapted to be unwound from a third roll, which will be located in the one location after the second web is spliced to the first web and the second web is running along the path of travel; where the plastic material of the first, second and third webs is the same material and will melt when heat, above a predetermined web melting temperature, is applied to the material; where the first, second and third webs each having a first surface with common characteristics and having a second surface; and where after the webs have been spliced and are running along the path of travel, downstream from the web splicing assembly, the first surfaces of the webs are to face the same direction, the improved method comprising the steps of:

A) disposing a portion of the leading end of the second web in the splicing assembly adjacent to the first web running by the splicing assembly so that the first surface of the second web faces in the opposite direction from the first surface of the first web;

B) momentarily stopping the running of a portion of the trailing end of the first web adjacent to the splicing assembly by clamping at least a part of the trailing end portion of the first web, in second surface to second surface contact, with at least a part of the leading end portion of the second web so that the parts of the first and second web portions are clamped in a second surface to second surface relationship;

C) applying heat to a localized area of the first and second web portions, which area extends the full width of the first and second webs so that the webs are melt-severed at and along the area and are heat-sealed together adjacent to the area;

D) maintaining the parts of the first and second web portions clamped together for a relatively short time after the first and second web portions have been severed so that the heat-seals, formed adjacent to the area, may cool below the predetermined temperature; and E) unclamping the parts of the first and second web portions and permitting the first web portion to begin running again and to take the second web with it, due to the downstream heat-seal between the first and second web portions, so that the first surface of the first web and the first surface of the second web face in the same direction.

2. The improved method of claim 1 wherein the web rolls are unwound by rotating the rolls in the same clockwise or counter-clockwise direction; wherein the first, second and third webs each have a second surface with common characteristics; and which includes the step of clamping the part of the first web portion to the part of the second web portion so that the second surface of the first web is in like surface to surface contact with the first surface of the second web and so that the leading edge of the second web portion is directed in a direction generally opposite to that of the pre-clamped direction of travel of the first web portion whereby the first surface of the first web faces in the same direction as the first surface of the second web when the first and second webs run along the path of travel.

3. The improved method of claim 1 including a step of applying heat to the localized area of the first and second web portions by pressing a heated wire, which extends the full width of the web portions, into contact with the area.

4. The improved method of claim 1 wherein the splicing assembly includes a first sub-assembly having a first, relatively movable slide bar that is disposed in a first location adjacent to and on one side of the path of travel, and a second subassembly having a second, relatively fixed nip bar, that is disposed in a second location adjacent to and on the other side of the path of travel and that faces the first slide bar across the path of travel; and which includes the steps of preparing the leading end portion of the second web for its heat-seal splice by disposing it about the second nip bar; running the part of the first web portion adjacent to the second nip bar; clamping the part of the first web portion to the part of the second web portion by moving the first slide bar a predetermined direction toward the second nip bar; applying heat to the area of the first and second web portions by moving a heated wire, which extends the full width of web portions into contact with the area, and then through the first and second web portions; and unclamping the clamped parts of the first and second web portions by moving the first slide bar away from the second nip bar.

5. The improved method of claim 4 wherein after the first and second webs have been heat spliced and the second web, instead of the first web, is running along the path of travel, the third roll is located in the one location in place of the first roll; wherein the first subassembly also has a first, relatively fixed nip bar; wherein the first subassembly may be selectively moved between a first position in which the first slide bar is disposed, at the first location, and a second position in which the first nip bar is disposed at the first location and in which the first slide bar is disposed away from the first location; wherein the second sub-assembly also has a second relatively movable slide bar; wherein the second subassembly may be selectively moved between a first position in which the second nip bar is disposed at the second location, and a second position in which the second slide bar is disposed at the second location and in which the second nip bar is disposed away from the second location; and which includes the steps of: moving the first and second subassemblies to their second positions; disposing a portion of the leading end of the third web about the second nip bar; momentarily stopping the running a portion of the trailing end of the second web by the splicing assembly by clamping at least a part of the trailing end portion of the second web, in like surface to surface contact, with at least a part of the leading end portion of the third web so that the parts of the first and second web portions are clamped, in a surface by surface relationship, by moving the second slide bar toward the first nip bar in a predetermined direction; applying heat, above the predetermined temperature, to a localized area of the second and third web portions, which area extends between the first and second side edges of the second and third webs, so that the webs are melt-severed along the area and are heat-sealed together adjacent to the area; maintaining the parts of the second and third web portions clamped together for a relatively short time after the second and third web portions have been severed so that the heat-seals, formed adjacent to the area, may cool below the predetermined temperature; unclamping the parts of the second and third web portions and permitting the second web to begin running again and to take the third web with it, due to the downstream heat-seal between the second and third web portions so that the first surface of the second web faces in the same direction as the first surface of the third web as the second and third webs run along the path of travel downstream from the splicing assembly.

6. The improved method of claim 5 wherein the web rolls are unwound by rotating the rolls in the same clockwise or counter-clockwise direction; and which includes the step of clamping the part of the third web portion to the part of the second web portion so that the second surface of the second web is in contact with the first surface of the third web and so that the leading edge of the third web is directed in a direction generally opposite to that of the pre-clamped direction of travel of the second web portion whereby the first surface of the third web faces in the same direction as the first surface of the second web when the second and third webs run along the path of travel downstream from the splicing assembly.

7. The improved method of claim 6 wherein the first, second and third webs each have a second surface with common characteristics; wherein a heated wire is carried by and moves with the first slide bar; wherein a second heated wire is carried by and moves with the second slide bar; and wherein when the first and second slide bars abut the second and first nip bars, respectively, the first and second heated wires, respectively, continue to move in the predetermined direction to sever the clamped parts of the web portions.

8. In an improved splicing assembly for heat-seal splicing a trailing end of a running first, two-sided plastic material web and a leading end of a second, two-sided plastic material web together, and then for heat-seal splicing the leading end of a third, two-sided plastic material web and a trailing end of the then running second web together, and so on; where when running, the first web is being unwound from a first roll, which is located in one predetermined location relative to a web splicing assembly; where the first web runs along a predetermined path of travel from the first roll, past the splicing assembly, through a web festoon, and through the web processing operation; where the second web is adapted to be unwound from about a second roll which is located at another predetermined location relative to the web splicing assembly; where the third web is adapted to be unwound from a third roll which will be disposed in the one location after the second web is spliced to the first web and the second web is running along the path of travel;

where the plastic material of the first, second and third webs are the same material and will melt when heat, above a predetermined temperature, is applied to the web material; where the first, second and third webs each having a first surface with the common characteristics and having a second surface; and where after the webs have been spliced and are running along the path of travel downstream from the web splicing assembly, the first surfaces of the webs face the same direction, the improved splicing assembly comprising:

a first splicing sub-assembly that is disposed adjacent to one side of the path of travel, that has a first relatively movable slide bar and a first relatively fixed nip bar, and that is movable between a first position in which the first slide bar is disposed at a first location adjacent to and on the one side of the path of travel and in which the first nip bar is disposed away from the first location, and a second position in which the first nip bar is disposed in the first location and in which the first slide bar is disposed away from the first location;

a second sub-assembly that is disposed adjacent to the opposite side of the path of travel, that has a second relatively fixed nip bar and a second relatively movable slide bar, and that is movable between a first position in which the second nip bar is disposed in a second location adjacent to the opposite side of the path of travel and facing the first slide bar of the first sub-assembly, when the first sub-assembly is in its first position, and in which the second slide bar is disposed away from the second location; and a second position in which the second slide bar is disposed in the second location adjacent to the opposite side of the path of travel and facing the first nip bar of the first sub-assembly, when the first sub-assembly is in its second position and in which the second nip bar is disposed away from the second location;

means for selectively moving the first slide bar in a direction toward the second nip bar, when the first and second sub-assemblies are in their first positions, so as to clamp a portion of the running web and a portion of the web to be spliced to the running web therebetween, with the first surface of the running web facing in the opposite direction from the first surface of the web to be spliced, and so as to stop the clamped portion of the running web from continuing to run along the path of travel;

means for selectively moving the second slide bar in a direction toward the first nip bar, when the first and second sub-assemblies are in their second positions, so as to clamp a portion of the running web and a portion of the web to be spliced to the running web therebetween, with the first surface of the running web facing in the opposite direction from the first surface of the web to be spliced, and so as to stop the clamped portion of the running web from continuing to run along the path of travel;

the first and second slide bars each including means for applying heat, with a predetermined temperature, to a localized area, which extends the full width of the clamped web portions, so as to heat sever the clamped web portions along the area and so as to heat-seal the adjacent parts of the clamped web portions together;

means for moving the first slide bar away in a second direction from the second nip bar when the first and second sub assemblies are in their first positions after the clamped web portions have been heat-sealed together so that the running web may begin again to run along the path of travel together with the spliced web and so that the first surface of the running web and the first surface of the spliced web face in the same direction; and means for moving the second slide bar in a second direction away from the first nip bar when the first and second sub-assemblies are in their second positions and after the clamped web portions have been heat-sealed together so that the then running web may begin again to run along the path of travel together with the spliced web and so that the first surface of the running web and the first surface of the spliced web face in the same direction.

9. The improved splicing assembly of claim 8 wherein the means for applying heat includes a first heated wire that is carried by and moves with the first slide bar and a second heated wire that is carried by and moves with the second slide bar.

10. The improved splicing assembly of claim 9 wherein the first, second and third webs each have a second surface with common characteristics; wherein after the first slide bar abuts the second nip bar, the first heated wire carried by the first slide bar continues to move in the direction so as to pass through the web portions clamped between the first slide bar and the second nip bar; and wherein after the second slide bar abuts the first nip bar, the second heated wire carried by the second slide bar continues to move in the direction so as to pass through the web portions clamped between the second slide bar and the first nip bar.

* * * * *

UNITED STATES PATENT AND TRADEMARK OFFICE
CERTIFICATE OF CORRECTION

PATENT NO. : 5,669,998
DATED : September 23, 1997
INVENTOR(S) : James K. Ward, et. al.

It is certified that error appears in the above-identified patent and that said Letters Patent is hereby corrected as shown below:

In Column 2, Line 11, replace "result of a the splice" with "result of the splice";

In Column 11, Line 19, replace "contact with the first surface" with "contact with the second surface";

In Column 12, Line 8, replace "first and second" with "second and third";   In Column 12, Line 33, replace "the first surface" with "the second surface".

Signed and Sealed this

Tenth Day of March, 1998

*Attest:*

BRUCE LEHMAN

*Attesting Officer*    Commissioner of Patents and Trademarks

US005669998B1

REEXAMINATION CERTIFICATE (3872nd)

United States Patent [19]
Ward et al.

[11] B1 5,669,998
[45] Certificate Issued Sep. 7, 1999

[54] HEAT-SEAL SPLICING ASSEMBLY AND METHOD

[75] Inventors: James K. Ward, Rockton; Daniel S. Kelly, Rockford, both of Ill.; Timothy J. Searles, Brodhead, Wis.

[73] Assignee: Martin Automatic Inc., Rockford, Ill.

Reexamination Request:
No. 90/005,089, Aug. 26, 1998

Reexamination Certificate for:
Patent No.: 5,669,998
Issued: Sep. 23, 1997
Appl. No.: 08/434,748
Filed: May 4, 1995

Certificate of Correction issued Sep. 23, 1997.

[51] Int. Cl.[6] .................................................... B65H 69/06
[52] U.S. Cl. .......................... 156/159; 156/157; 156/504; 242/552; 242/556
[58] Field of Search ...................... 156/157, 159, 156/304.1, 304.3, 304.6, 308.2, 502, 504, 505, 506; 242/552, 556, 556.1

[56] References Cited

U.S. PATENT DOCUMENTS 3,610,547 10/1971 Anderson ................................. 242/552
3,705,069 12/1972 Elrod et al. ............................... 156/502
4,246,053 1/1981 Platt et al. ................................ 156/159
5,318,646 6/1994 Cardini et al. ........................... 156/157

*Primary Examiner*—James Sells

[57] ABSTRACT

A method and web splicing assembly for heat-seal splicing together a trailing end of running first, two-sided plastic material web and a leading end of a second, two-sided plastic material web, and then for heat-seal splicing together a leading end of a third, two-side plastic material web and the trailing of the then running, second web so that after the webs have been spliced and are running, like surfaces of the webs face the same direction. The web splicing assembly includes first and second splicing sub-assemblies. The first sub-assembly has a first, relatively movable slide bar and a first, relatively fixed nip bar. The second sub-assembly has a second, relatively movable slide bar and a second, relatively fixed nip bar. The sub-assemblies are each movable between a first position and a second position. In their first positions, the sub-assemblies are disposed so that portion of the webs to be heat-seal spliced are clamped between the first slide bar and the second nip bar. In their second positions, the sub-assemblies are disposed so that the portions of the webs to be heat-seal spliced are clamped between the second slide bar and the first nip bar. Each slide bar carries a heated wire that heat severs the clamped web portions along a localized area that extends across the web portion and heat-seals parts of the clamped web portions together adjacent to the area.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

\* \* \* \* \*